(12) United States Patent
Holzapfel et al.

(10) Patent No.: US 10,734,775 B2
(45) Date of Patent: Aug. 4, 2020

(54) SLIP RING WITH SELECTIVE WEAR INDICATION

(71) Applicant: Schleifring GmbH, Fürstenfeldbruck (DE)

(72) Inventors: Christian Holzapfel, Fürstenfeldbruck (DE); Holger Häffner, Schwabmünchen (DE)

(73) Assignee: SCHLEIFRING GMBH, Fürstenfeldbruck (DE)

(*) Notice: Subject to any disclaimer, the term of this patent is extended or adjusted under 35 U.S.C. 154(b) by 0 days.

(21) Appl. No.: 16/404,098

(22) Filed: May 6, 2019

(65) Prior Publication Data
US 2019/0267765 A1    Aug. 29, 2019

Related U.S. Application Data

(63) Continuation of application No. PCT/EP2017/077411, filed on Oct. 26, 2017.

(30) Foreign Application Priority Data

Nov. 8, 2016    (EP) .................................... 16197826

(51) Int. Cl.
*H01R 39/58* (2006.01)
*H04B 3/46* (2015.01)

(52) U.S. Cl.
CPC .............. *H01R 39/58* (2013.01); *H04B 3/46* (2013.01)

(58) Field of Classification Search
CPC .................................. H01R 39/58; H04B 3/46
See application file for complete search history.

(56) References Cited

U.S. PATENT DOCUMENTS

| | | | | | |
|---|---|---|---|---|---|
| 5,177,419 | A | * | 1/1993 | Pickering | G01R 31/34 318/541 |
| 5,638,387 | A | * | 6/1997 | Palleggi | B66F 9/07595 318/67 |
| 2004/0029531 | A1 | * | 2/2004 | Lohr | H04B 5/0043 455/41.2 |
| 2013/0218514 | A1 | | 8/2013 | Schieke et al. | |

FOREIGN PATENT DOCUMENTS

| | | |
|---|---|---|
| CN | 202340045 | 7/2012 |
| GB | 2461533 | 1/2010 |
| WO | 0203403 | 1/2002 |

OTHER PUBLICATIONS

Roberge, R., "Wind Turbine Slip Rings: How Round is Round?" XP-002776016, North American Clean Energy, May 20, 2012, 3 pages.

* cited by examiner

*Primary Examiner* — Nader Bolourchi
(74) *Attorney, Agent, or Firm* — Quarles & Brady LLP; Yakov Sidorin

(57) ABSTRACT

A slip ring unit comprises a brush block with multiple brushes rotatable against a module with multiple sliding tracks. A position encoder is connected to the brush block and the module, for detecting the relative position between the brush block and the module. An evaluation unit receives signals from the position encoder and generates a position-dependent signal indicating wear. The evaluation unit has multiple wear counters assigned to multiple positions and/or sections of the slip ring. If a movement is detected within a certain section, the related wear counter is incremented to allow to monitor wear at slip rings that are not continuously rotating.

15 Claims, 5 Drawing Sheets

SLIP RING WITH SELECTIVE WEAR INDICATION

CROSS-REFERENCE TO RELATED APPLICATIONS

This application is a continuation of pending International Application No. PCT/EP2017/077411 filed on 26 Oct. 2017 and now published as WO 2018/086895 A1, which designates the United States and claims priority from European Application No. 16197826.7 filed on 8 Nov. 2016. The disclosure of each of the above-identified applications is incorporated herein by reference.

BACKGROUND

1. Field of the Invention

The invention relates to slip rings configured to transmit electrical signals between rotating parts.

2. Description of Relevant Art

Electrical slip rings are used to transfer electrical power and/or signals between a rotating part and a stationary part of a given system. Electrical slip rings are used in different applications, such as wind energy plants or computer tomography scanners, for example. There are also many defense and aerospace applications.

In a slip ring, the electrical contact is established between a cylindrical drum, having sliding tracks that are arranged in an axial direction, or a disk that has sliding tracks with different diameters arranged radially, and a brush. A brush may generally include a contacting wire or a plurality of contacting wires.

Practically all of the applications of a slip ring require that a slip ring possess a high lifetime and a low contact resistance, as well as a low contact noise. Wear originating due to the mechanical friction between the brush and the sliding track causes the slip ring to degrade over time.

Related art discussed some wear indicators that operate by determining the length of a carbon brush and, therefore, indicate the wear of the brush. In most slip rings the sliding tracks have significantly longer lifetimes than the corresponding brushes, but the sliding tracks are also susceptible to wear. In WO 2002/03403 A2 a slip ring diagnosis system is disclosed. It determines the wear status by measuring electrical parameters such as contact resistance or contact noise.

In CN 202 340 045 U a slip ring with an added angle encoder is disclosed. This angle encoder is used for monitoring rotational speed, angular acceleration, and angular position. The disclosed device has no means for measuring or indicating wear.

US 2013/218514 A1 discloses a sliding brush with integrated temperature sensor for continuously-rotating machines, such as motors and generators. With increasing brush temperature the wear increases and, accordingly, the required maintenance is indicated. Due to the thermal inertia of the brush, only long-time observations (over many minutes or a large number of rotations) may be implemented.

GB 2 461 533 A discloses a device for estimation of wear in wind-turbine slip rings. The rotational speed of the continuously-rotating rotor is measured and an index of wear (a wear index) is calculated.

Extensive tests have shown that the kind and distribution of wear of slip ring tracks may vary between applications. A slip ring track at a continuously-rotating device (such as a radar antenna, for example) has an evenly-distributed wear over the whole length of the track. If a slip ring is used in a discontinuously-operating device (such as an industrial robot, for example), some sections of the sliding track may show more wear than other sections. This makes a wear indication comparatively difficult and unreliable.

SUMMARY

This disclosure presents the embodiments configured to provide a reliable indication of wear of a sliding track.

In an embodiment, a slip ring device (or unit) includes at least one sliding track and at least one brush that, in operation, slides on the track, with the brush arranged movably and/or rotatably with respect to and against the track. The embodiments is complemented with an encoder i configured to detect relative angular position and/or angular movement between at least one sliding track and at least one brush. The encoder is mechanically coupled to at least one sliding track and to at least one brush.

The encoder may be configured as a position encoder or an angular encoder. The operation of the encoder may be based on optical, magnetic, mechanical, or any other suitable encoder technology. The encoder may have a sensor that is movable against a marker section. The marker section preferably includes a plurality of markers, which can be detected by the sensor. Preferably, the sensor is mechanically connected to at least one brush, whereas the marker section is mechanically connected to at least one sliding track. A very compact design may result in mounting the sensor to a brush block that holds a plurality of brushes. The sensor and the marker section may also be exchanged or "flipped", such that the sensor is mechanically connected to the sliding track and the marker section is connected to the brushes. The encoder may also be structured as a single-part component (for example, in the case of an angular encoder that are single-part components having a housing and a driveshaft). Alternatively or in addition, the encoder may also be arranged as part of a motor encoder driving a complex device that comprises the slip ring. The encoder preferably is directly connected to the slip ring, but it may also be indirectly connected (for example, by means of an appropriate gearbox). The term "mechanically connected" has the meaning of and implies to be fixed or fixedly connected, such that there may exist only slight movements between the mechanically-connected components for required compensation of mechanical tolerances. The corresponding mechanical connection between the components is not a rotatable or slidable connection. The connection may be a direct or an indirect connection, such as the brush and the encoder are mounted to the same printed circuit board.

The encoder may be a so-called absolute encoder or, alternatively, a relative encoder, or any other means configured to obtain the slip ring angular position data. As a skilled artisan will readily appreciate, in the case of a relative encoder, there must exist at least one absolute position reference. Such an absolute position reference may be a different or additional marker. Alternatively, an absolute position reference may be provided by a mechanical stop, which is mechanically limiting the range of movement of the slip ring.

Furthermore, the embodiment includes an evaluation electronic circuitry unit configured to receive signals from the position encoder and to generate a signal representing and/or indicating an angular-position-dependent wear of the slip-ring (that is, an angular-position-dependent wear-indication signal). Such wear-indication signal may be a single digital signal indicating a failure of the embodiment (a failure condition). Generally, however, multiple signals indicating multiple stages of wear may be employed. Alternatively or in addition, there may also be used an analog signal providing a value indicating the amount of wear. Furthermore, an electrical bus may be provided that is configured to deliver detailed wear information. This bus may also be used to configure the evaluation electronic circuitry (unit). In one implementation, the evaluation unit is configured to receive a reset signal, for example when the sliding tracks or brushes have undergone some maintenance or have been replaced. Such a reset signal may be received via a bus, by a signal line, by a switch, which may also be a magnetic triggered switch or any other suitable means. The wear-indication signal may also be represented by any other appropriate signal and/or configured as a data value in a storage memory.

The evaluation unit preferably is configured to selectively record the presence and/or movement of a brush or of multiple brushes over a certain angular position of a sliding track. The evaluation unit may also be configured to selectively record the presence of and/or movement of the rotating and/or movable angular sections (or sectors) in general. The selective recordation of the presence of and/or movement between the rotating and/or movable angular second is simpler to perform and requires lower resources on memory and computational power.

Preferably, the evaluation unit is configured to receive the encoder signal and to generate an output/value representing a position (referred to as a position value) of the encoder. In the simplest case, the position value is the same as the encoder signal itself. Depending on the situation, it may also be necessary to scale and/or calibrate the encoder signal. The encoder signal may be multiplied or divided by a certain factor, and/or modified by adding/subtracting a position offset from it. If the position value does not change, it is an indication that there exists no movement of the brush against the track. If the position value changes, however, a movement is detected. Generally, such a movement generates wear of the moving components.

The evaluation unit may include a microcontroller, a field-programmable gate array (FPGA), a desktop computer, an industrial control, or any other suitable device having a tangible data storage or storage medium comprising software that is configured to perform the evaluation tasks. In practice, the evaluation unit may be integrated into a slip ring unit housing, or it may be contained in a discrete housing that is separated from the slip ring unit. It may also be part of a control unit of a larger system (e.g., a manufacturing machine) that comprises the slip ring unit.

In one embodiment, there exist multiple wear counters that are dedicated (assigned) to multiple angular positions of a slip ring and/or angular sections or sectors of the slip ring. For example, a range of full rotation over 360° may be divided into 36 angular sections or sectors, each section or sector covering 10° of angular rotation. In a different embodiment, the angular resolution of rotation may be chosen to be higher, for example 1° or even 0.1°. If movement is detected in a certain angular section, the count of the wear counter corresponding this section may be increased. In a related implementation, there may be employed independent wear counters for different directions of movement. In yet another embodiment, the speed of the movement may be detected, for example by evaluating the time between changing position values (that is, time lapse associated with a change of the position value). The count registered by the wear counter may be increased dependent on the detected speed. The increase of the wear count with speed may be linear—such that for example at a low speed the wear counter is increased with a given increment (for example, by 1) and at twice the speed the wear counter is increased with a different increment (for, example, by 2)—or exponential. Additionally, the wear counter may be incremented depending on the maximum acceleration or deceleration that is applied to the brush when traveling through the counter device operably assigned to the section. In addition to acceleration (derivative of speed) also the derivative of the acceleration may have influence on the wear counter to resemble the actual brush wear of the slip ring.

In another embodiment, there is at least one auxiliary sensor configured to detect and/or measure at least one characteristic representing the operation of the slip ring unit (an operational value) such as temperature, humidity, acceleration etc. Also, electrical values—such as a voltage across the slip ring or a current through the slip ring—may be measured. It is known, for example, that electrical load also influences wear of the slip ring unit and, therefore, in one embodiment the electrical load may be considered to be kept track of by the wear counter. The measured values may further influence the wear counter values. In one example, the increment of the count of the wear counter of 1 at a standard (nominal) temperature would be changed to a different increment, for example 2, at the temperature that is 10° higher than the nominal temperature, and to the increment of 4 at the temperature that is 20° higher than the nominal temperature, and so on.

If multiple brushes are used in a slip ring, the corresponding wear counters assigned to the sections where the brushes are located, may be increased. If, for example, 3 brushes are provided around the slip ring (each spaced 120° apart from the next brush), the wear counters of the 3 sections spaced 120° apart and corresponding to the used 3 brushes may be increased. Alternatively or in addition, separate wear counters may be implemented for different application of the tracks (e.g. one wear counter for signal and one for power transmission per different module diameter; per different brush configurations—such as one for single-wire brushes and another for multiple-wire brushes; per different contacting technology—e.g. one for metal graphite brushes and another for gold wire brushes) in the same slip ring.

As described above, the counts of the wear counters may increase differently at different sections according to the relative wear of the components of the slip ring unit in these sections. The embodiment may be configured such that, if the count of at least one wear counter approaches and/or reaches a limit value, a wear-indication signal may be generated. Also, a wear warning signal may be issued, for example, if the count of at least one counter is increasing rapidly (as appropriately defined in comparison with the expected increase of the count). Such a wear-warning signal may be an optical signal, for example that produced by an LED. It may also be configured as an electrical analog or digital signal.

The evaluation unit may be equipped with a backup battery, which may also allow operation when no power is supplied to the evaluation unit. It may also have a non-volatile memory configured to store longtime data values. There may also be a battery-check electronic circuit for monitoring the status of the battery.

A further embodiment relates to a wear indication in industrial robots. Here, the encoder may be a part of the robot, for example integrated into an arm or any other part of the robot. The evaluation unit may also be a part of the robot, such as the motion-control computer. Here, the evaluation may be performed by software.

The described embodiments relate to the measurement and evaluation of an angular position of a rotatable and/or tiltable slip ring device. Therefore, terms such as position, movement etc. are defined to always relate to the angular position, the angular movement etc., of the identified component of the slip ring with respect to the chosen rotation axis. Furthermore, there is no difference whether it is the slip ring module (or device) or the brush(es) that is/are rotating: what is being considered and remains essential is a relative movement of the slip ring and the brush(es) against each other.

Another aspect relates to a method of wear evaluation of a slip ring that comprises at least one brush rotatable against at least one sliding track. The method includes the steps of:
  receiving signals from an encoder configured to detect the relative position between at least one brush and a corresponding sliding track, and
  generating a position-dependent wear-indicating signal thereof.

Furthermore, multiple wear counters may be assigned to multiple positions (locations) and/or sections of the slip ring.

Also, a wear counter may be configured to incrementally change the associated count if a change of position has been detected at the associated with the wear counter location/section of the slip ring.

The implementation of the above-described method may be in practice combined with and/or complemented with any other feature described in this disclosure.

BRIEF DESCRIPTION OF THE DRAWINGS

In the following, the invention will be described by way of example, without limitation of the general inventive concept, with reference to the drawings, among which.

Figure 1:
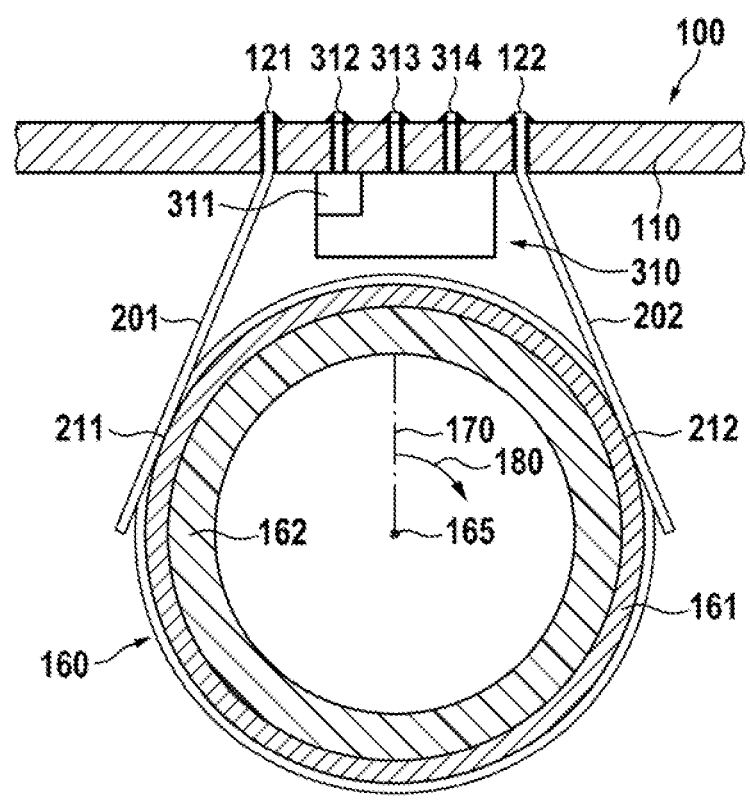
FIG. 1 shows an embodiment of the invention in a sectional front view.

While the specific example of embodiments are shown in the drawings and are discussed below, it is understood that embodiments of the invention can be modified and assume alternative forms. The drawings and the corresponding detailed description thereto are not intended to limit the invention to the any particular disclosed form, but to the contrary, the scope of the intention is intended to cover all modifications, equivalents, and alternatives falling within the spirit and scope of the present invention as defined by the appended claims.

DETAILED DESCRIPTION

In FIG. 1 an embodiment of the slip ring unit is shown. In this example, the slip ring unit comprises a cylindrical slip ring module or unit 160 having at least one sliding track 161 of an electrically-conductive material (such as a metal, in one example), which is supported by an electrically-insulating body 162 (preferably made of a plastic material). The slip ring unit 160 is rotatable about a center axis 165, herein also referred to as a rotation axis. The reference line 170 indicates a zero-degree position (orientation) with the slip ring module (or the brush block 100), with respect to which the rotation occurs. As an example, the arrow 180 indicates the rotation clockwise. There may be the (preferably stationary) brush block 100 comprising an insulating body 110 that holds at least one contact wire 201, 202. The contact wire(s) may be affixed to the block 100 by soldering the connections 121, 122 of the wire(s) into through-holes of the insulating body 110 of the block 100. The contact wire(s) have contact area(s) 211, 212, at which these wires contact the slip ring unit 160. It is understood, that any other type of slip ring, track, or brush may be used in this embodiment. A sensor unit 310, preferably configured as part of an encoder, further includes an evaluation unit 311 that in operation may provide/deliver a signal to the wear-signal output 312. In this space-saving embodiment, both the evaluation unit and the sensor unit are in the same housing. (They may alternatively be contained in separate housings.) There may be first and second power contact 313, 314 present at the block 100 to provide operational power to the sensor unit 310. Typically, such operational power may be provided in a form of low voltage, in the range between 5 and 24 Volts and low power of a few watts.

Figure 2:
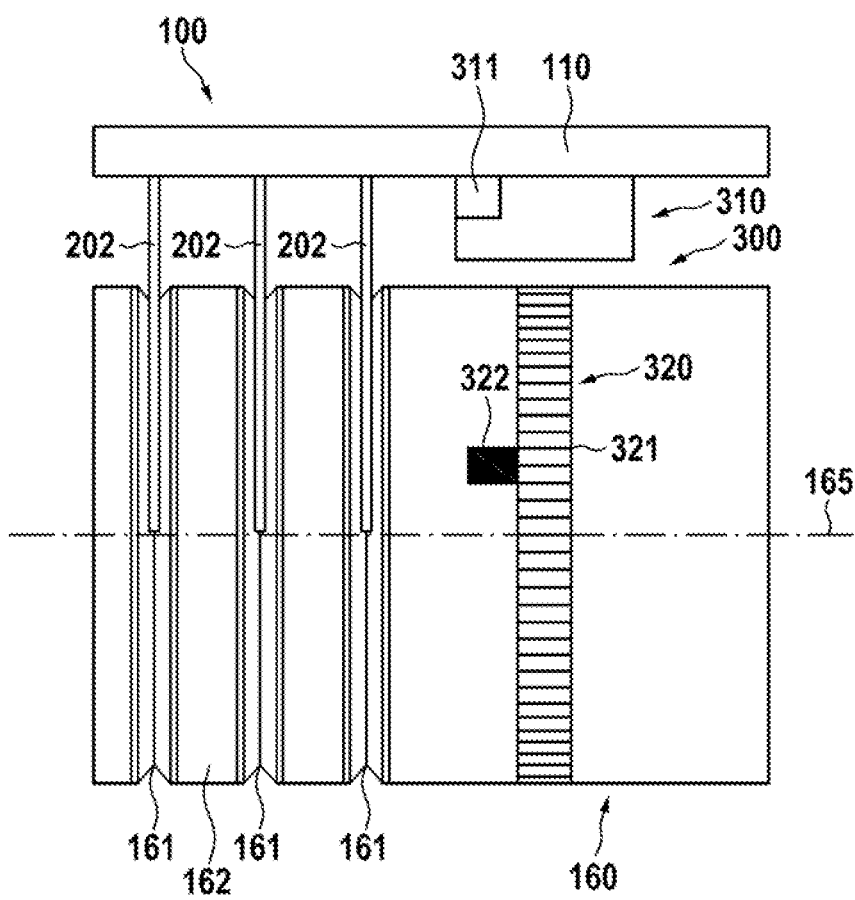
FIG. 2 illustrates a side view of the embodiment of FIG. 1.

In FIG. 2, the example of the slip ring unit 160 is shown in a side view. The cylindrical module of the slip ring unit 160 shows sliding tracks 161 spaced apart with the portions of the insulating body 162. The sliding tracks 161 are shown to have V-shaped grooves dimensioned to guide the contact wires 201, 202. In this Figure, three sliding tracks 161 that are electrically-isolated from each other are shown together with the corresponding brushes 202, which are also electrically-isolated from each other, thereby allowing for simultaneous transfer of three signals or three electrical-current paths over the slip ring.

Furthermore, a position encoder 300 is shown. The position encoder 300 includes a sensor unit 310 (which, in turn, incorporates the evaluation unit 311) and a marker section 320 (on the body 162) that comprises a plurality of first markers 321 and at least one optional second marker 322. Preferably, the first markers 321 are spaced equally from one another and may be dimensioned to provide a relative reference, whereas the at least one second marker 322 may be used to provide an absolute reference. The markers may be detected by the sensor unit 310 with the use of an optical, magnetic, or any other suitable sensor that is part of the sensor unit 310. The evaluation unit 311 preferably contains a digital logic circuitry and/or a microcontroller. The evaluation unit 311 is configured to generate a wear-indication signal based on the signals from the position encoder. The position encoder provides a numerical output representing absolute or relative position of the slip ring. A change in the position encoder value implies that a position must have been changed. Consequently, a determination is made that a movement has occurred.

The evaluation unit 311 preferably has multiple wear counters assigned to (operably associated with) angular sections of the slip ring unit 160 that are related to relative angles between the brush block 100 and the module of the slip ring unit 160. Preferably, the count of a wear counter is increased if a position change is indicated (occurs) in the respectively-corresponding assigned angular section.

Figure 3:
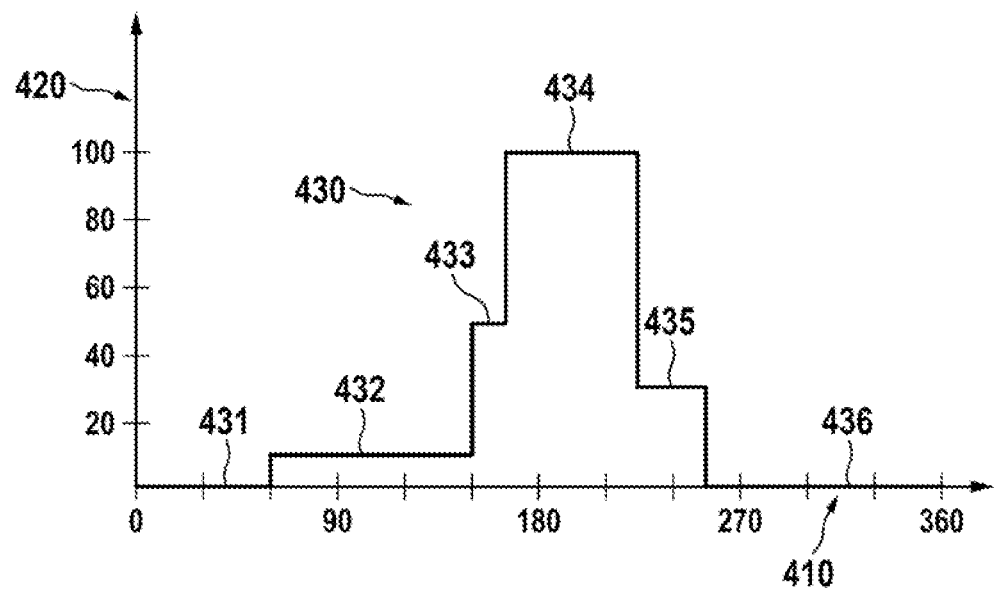
FIG. 3 shows a wear counter diagram.

FIG. 3 shows a wear counter diagram. The abscissa is an angular axis 410 indicating relative angles from 0° to 360°. The counter value axis 420 (the ordinate) indicates the counter value in thousands from zero to 100,000, as shown. The curve 430 shows the counted values as a function of relative angles of the slip ring (which slip ring may be used in an industrial robot). Such industrial robot has angular operating ranges that are not usable, for example due to the mechanical limits. These operating ranges correspond to the sections 431 and 436 of the counter curve 430, where the count value is at or close to zero. There may be secondary operating range(s), for example those corresponding to moving the robot from an idle position to a primary operating position. One of such secondary ranges is indicated by the curve section 432, representing the low number of the detected counts. In each of the primary operating ranges 433, 434 and 435, a significantly higher number of counts is shown. Understandably, the highest number of counts in section 434 of the curve 430 represents and is associated with the most limiting factor of the lifetime of the slip ring.

Figure 4:
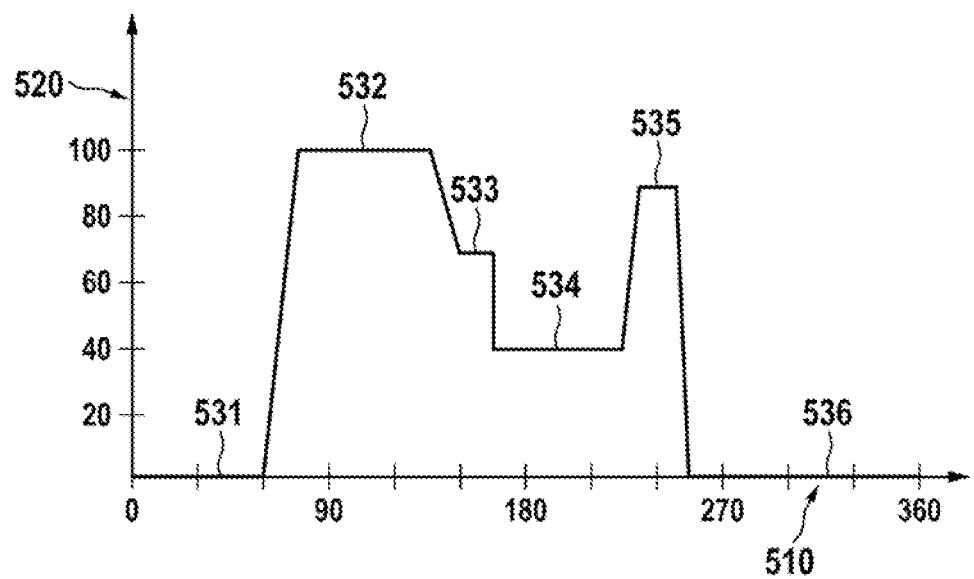
FIG. 4 presents a weighted wear counter diagram.

FIG. 4 shows a weighted wear counter diagram. This diagram is derived based on the previous diagram of FIG. 3, but here the additional weight factor is given to the speed of relative rotation between the block 100 and the slip ring unit 160. Abscissa is represented by an angular axis 510 to indicates relative angles of rotation from 0° to 360°. The counter value axis 520 (the ordinate) indicates count values of the counter in thousands from zero to 100,000. In this example, as the industrial robot incorporating the slip ring unit 160 is moved with the highest possible speed through the second operating range, the count of the wear counter is modified with the additional weight-factor due to the high speed and reaches the highest value 532 of the curve 530 representing the weighted counter diagram. For operation in the primary operating ranges/sections, high accuracy is required and, therefore, the operating speed of the embodiment is lower, which results in lower weight-factor(s) and correspondingly-lower count(s), as shown by sections 533, 534 and 535 of the weighted counter diagram. Again, there exist very low counter values in the unused sections 531 and 536.

Figure 5:
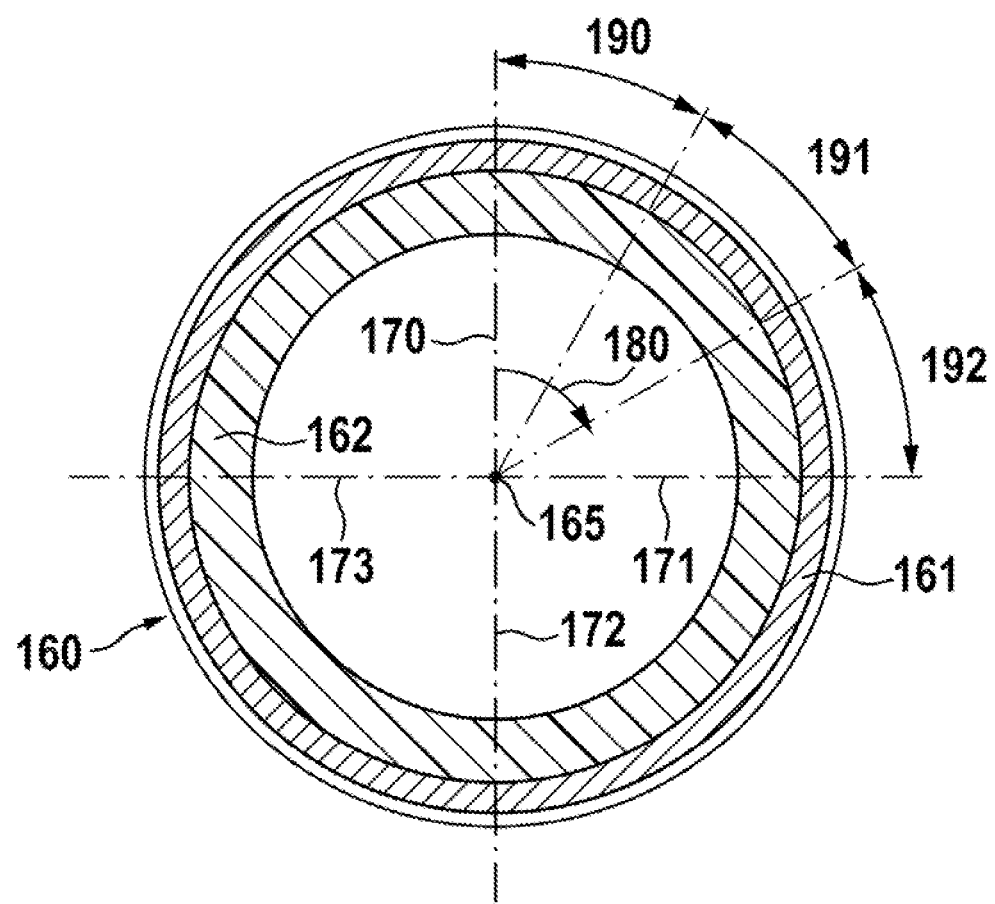
FIG. 5 provides more details of an embodiment of a rotating slip ring module.

FIG. 5 shows additional details of an embodiment of the rotating slip ring module. Here, in addition to the position 170 that represents the 0° angle, the 90°-position 171, the 180°-position 172, and the 270°-position 173 are indicated. As mentioned above, the wear may be monitored for example at the locations corresponding to each of these angular positions by monitoring the presence of the brush at these positions. Also, a wear indication may be effectuated at any other, preferably higher number, of positions. Furthermore, the example of three angular sections 190, 191 and 192 are shown. In this embodiment, each of these angular sections are characterized by the same angle of 30°, but generally the chosen angular sections may subtend any other angle(s). Also, the angular sections may be defined to be unevenly distributed over a full angular range (that is defined from 0 to 360 degrees). The angular sections may be chosen to vary in size and/or location around the circumference of the slip ring unit 160, dependent of a specific wear pattern or monitoring requirement.

Figure 6:
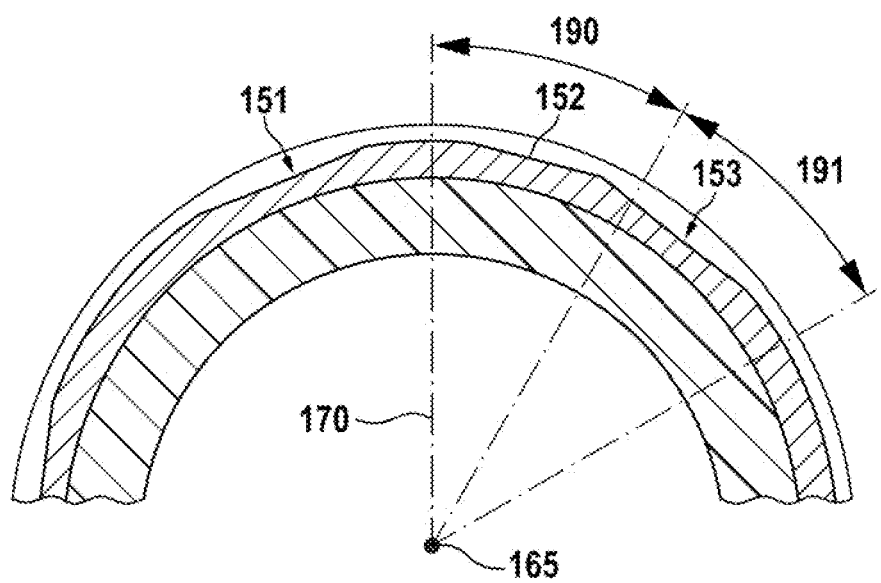
FIG. 6 shows a slip ring module with a sliding track characterized by the position-dependent wear.

FIG. 6 illustrates a portion of a slip ring module with a sliding track that has a position-dependent wear. Here, a significant wear can be observed at positions 151, 152, 153. The wear at position 153 is shown to be the largest. Accordingly, the wear indication in the angular section 191 (that covers the position 153) has the largest value.

It will be appreciated to those skilled in the art having the benefit of this disclosure that this invention is believed to provide slip rings and parts thereof. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 brush block
110 insulating body
121 soldering connection
122 soldering connection
151, 152, 153 wear positions
160 slip ring module or slip ring unit
161 sliding track
162 insulating body
165 rotation axis
170 zero degree angular reference line
171 90° position
172 180° position
173 270° position
180 direction of rotation
190, 191, 192 angular sections
201 contact wire
202 contact wire
211 contact area
212 contact area
300 encoder
310 sensor unit
311 evaluation unit
312 wear-signal output
313, 314 power contacts
320 marker section
321 first markers
322 second marker
410 angular axis
420 counter axis
430 counter curve
431-436 counter curve sections
510 angular axis
520 counter axis
530 weighted counter curve
531-536 weighted counter curve sections

The invention claimed is:

1. A slip ring unit comprising:
   at least one sliding track and at least one brush configured to be moved about one another during the operation of the slip ring unit,
   a position encoder configured to detect an angular position between the at least one brush and the at least one sliding track and to generate a first signal representing said angular position, and
   an evaluation unit configured to receive the first signal from the position encoder and to generate a second signal representing wear of the at least one sliding track, said wear being dependent on said angular position.

2. The slip ring unit according to claim 1, wherein the evaluation unit is equipped with multiple wear counters that are respectively operationally-assigned to at least one of (i)

multiple angular positions and (ii) multiple angular sections of the at least one sliding track.

3. The slip ring unit according to claim 2, wherein the evaluation unit is configured to increment a count of a wear counter, from the multiple wear counters, if a movement between the at least one brush and the at least one sliding track at a chosen associated position has been detected.

4. The slip ring unit according to claim 2, wherein the slip ring unit comprises at least one auxiliary sensor configured to measure at least one operational value of the slip ring unit, and the evaluation unit is configured to increase an increment of a count of a wear counter, from the multiple wear counters, dependent on at least one of sensor values,
wherein a sensor value, from the sensor values, corresponds to at least one of temperature, humidity, acceleration, voltage, and current at the slip ring unit.

5. The slip ring unit according to claim 1, further comprising a brush block holding the at least one brush and a slip ring module, wherein a sensor unit is mechanically affixed to said brush block and wherein the slip ring module holds an at least one marker section.

6. The slip ring unit according to claim 2, wherein the slip ring unit comprises at least one auxiliary sensor configured to measure at least one operational value, and the evaluation unit is configured to increase an increment of a count of a wear counter, from the multiple wear counters, dependent on at least one of sensor values,
wherein a sensor value, from the sensor values, corresponds to at least one of temperature, humidity, acceleration, voltage, and current at the slip ring unit.

7. The slip ring unit according to claim 1, wherein the position encoder comprises a sensor unit and at least one marker section that, in operation of the slip ring unit, moves relative to the sensor unit.

8. The slip ring unit according to claim 1, wherein the position encoder is mechanically connected to the at least one brush and the at least one sliding track.

9. The slip ring unit according to claim 1, further comprising a brush block holding the at least one brush and a slip ring module,
wherein the sensor unit is mechanically affixed to said brush block and wherein the slip ring module holds an at least one marker section.

10. The slip ring unit according to claim 1, wherein the position encoder is a single part component having a driveshaft and a housing.

11. The slip ring unit according to claim 1, wherein a slip ring of the slip ring unit and the encoder are configured as parts of an industrial robot.

12. The slip ring unit according to claim 1, wherein at least one of the following conditions is satisfied:
a) the evaluation unit comprises a microcontroller or microprocessor that includes a tangible memory with a software contained therein, the software configured to perform evaluation of spatial coordination between components of the slip ring unit; and
b) the evaluation unit is spatially separated from the at least one brush and the at least one sliding track.

13. A method for evaluation of wear of a slip ring unit, the method comprising steps of:
receiving signals from an encoder of the slip ring unit, the encoder configured to detect a relative angular position between the at least one sliding track and the at least one brush; and
generating a signal representing position-dependent wear of the slip ring unit, wherein the slip ring unit includes at least one brush configured to be rotatable against at least one sliding track.

14. The method according to claim 13, further comprising:
operationally assigning multiple wear counters to at least one of (a) respective multiple angular positions of a slip ring of the slip ring unit; and (b) multiple angular sectors of said slip ring.

15. The method according to claim 13, further comprising a step of
incrementing a count of a wear counter, from the multiple wear counters, if, at an angular position, from said multiple angular positions, that corresponds to said wear counter a change of position has been detected.

* * * * *